United States Patent [19]
Hiramoto et al.

[11] Patent Number: 5,697,477
[45] Date of Patent: Dec. 16, 1997

[54] AIR DAMPER

[75] Inventors: Kouji Hiramoto; Takashi Yao; Koji Toida, all of Aichi-ken, Japan

[73] Assignee: Nifco Inc., Kanagawa, Japan

[21] Appl. No.: 535,351

[22] Filed: Sep. 28, 1995

[30] Foreign Application Priority Data

| Oct. 7, 1994 | [JP] | Japan | 6-244176 |
| Oct. 7, 1994 | [JP] | Japan | 6-244177 |

[51] Int. Cl.⁶ .................................................. F16F 9/36
[52] U.S. Cl. ............................. 188/322.18; 188/322.22; 277/29; 277/165
[58] Field of Search .................. 188/322.16–322.19, 188/322.22, 284, 285, 288, 322.13, 300; 267/64.12; 277/29, 70, 71, 73, 165, 177

[56] References Cited

U.S. PATENT DOCUMENTS

| 4,307,875 | 12/1981 | Schnitzius et al. | 188/288 |
| 4,819,770 | 4/1989 | Hahn | 188/288 |
| 4,877,115 | 10/1989 | Bauer et al. | 188/322.18 |
| 5,325,943 | 7/1994 | Ralph | 188/288 |
| 5,409,087 | 4/1995 | Angermann et al. | 188/288 |

FOREIGN PATENT DOCUMENTS

| 59-27558 | 8/1984 | Japan . |
| 61-191539 | 11/1986 | Japan . |
| 4-1389 | 1/1992 | Japan . |
| 4-51227 | 12/1992 | Japan . |
| 5-6044 | 1/1993 | Japan . |

Primary Examiner—Robert J. Oberleitner
Assistant Examiner—Chris Schwartz
Attorney, Agent, or Firm—Baker & McKenzie

[57] ABSTRACT

An air damper includes: a piston adapted to reciprocate in a cylinder; an annular recessed portion formed along an outer periphery of the piston; a sealing member fitted in the recessed portion in a slidable manner, adapted to slidingly contact an inner peripheral surface of the cylinder, and forming air chambers on both sides of the piston, respectively, together with the piston; a communicating device allowing the air chambers formed on both sides of the piston to communicate with each other or not to communicate with each other depending on a stopping position of the sealing member; and a reduced-diameter portion formed by reducing a diameter of the cylinder on one end side thereof so as to gradually increase a frictional force between an inner periphery of the reduced-diameter portion and the sealing member.

10 Claims, 13 Drawing Sheets

AIR DAMPER

BACKGROUND OF THE INVENTION

1. Field of the Invention

The present invention relates to a cylinder-type air damper in which air in air chambers formed in a cylinder is allowed to flow through an orifice as a piston moves relatively in the cylinder, so as to effect damping.

2. Description of the Related Art

As an air damper of this type, for example, one for use in a glove box of an automobile is known.

That is, an air damper is arranged such that an opening in a cylinder is closed by a cap, and a piston rod penetrates the cap and extends outside the cylinder. The piston is provided with an O-ring, and the O-ring is fitted in an annular recess provided on an outer periphery of the piston and abuts against the inner periphery of the cylinder. Two air chambers are respectively formed on both sides of the piston (a first air chamber is formed on the bottom side of the cylinder, and a second air chamber is formed on the opening side of the cylinder).

The piston is provided with an orifice allowing the first air chamber to communicate with the second air chamber.

The recess has such a width as to allow the O-ring to move along the moving direction of the piston. When the piston changes its moving direction from the bottom of the cylinder toward the opening, the O-ring is moved from a second position to a first position by the frictional force between the O-ring and the inner periphery of the cylinder. Conversely, when the piston changes its moving direction from the opening toward the bottom, the O-ring is moved from the first position to the second position by the aforementioned frictional force. A groove is formed in the bottom of the recess, and when the O-ring is at the second position, the first air chamber and the second air chamber communicate with each other through the groove, while when the O-ring is at the first position, the groove is blocked.

When the piston moves toward the opening side of the cylinder, the air flows by means of the orifice, and a damping force operates on the basis of the flow resistance at the orifice. On the other hand, when the piston moves toward the bottom of the cylinder, the air escapes via the groove, and the damping force is reduced.

In a case where such an air damper is used in a glove box, the piston rod is connected to a lid of the glove box, and the cylinder is connected to the accommodating side of the glove box. When the lid is opened, the piston rod is drawn out through the cylinder, so that the piston moves from the bottom of the cylinder toward the opening. Consequently, when the lid is opened, the opening motion is made slow so as not to cause a shock. On the other hand, when the lid is closed, the closing motion is becomes faster.

In a case where the lid of the glove box is opened from a vertical state toward a horizontal state, the load applied to the lid becomes gradually greater (the load changes) as the lid is opened, so that the lid-opening speed becomes faster. Accordingly, as the lid approaches the position of this opening limit, the damping force caused by the air damper becomes insufficient. At the position of the opening limit of the lid, the lid sometimes bounds, so that a smooth opening motion cannot be obtained.

Meanwhile, if the damping force of the air damper acts during an initial period of the opening motion of the lid, it is conceivable that the lid may possibly remain in the vertical state and may not open.

SUMMARY OF THE INVENTION

In view of the above-described circumstances, it is an object of the present invention to provide an air damper for obtaining a satisfactory damping by coping with a change in the load by changing the damping force.

To this end, in accordance with one aspect of the present invention, there is provided an air damper comprising: a piston adapted to reciprocate in a cylinder; an annular recessed portion formed along an outer periphery of the piston; a sealing member fitted in the recessed portion in a slidable manner, adapted to slidingly contact an inner peripheral surface of the cylinder, and forming air chambers on both sides of the piston, respectively, together with the piston; communicating means allowing the air chambers formed on both sides of the piston to communicate with each other or not to communicate with each other depending on a stopping position of the sealing member; and a reduced-diameter portion formed by reducing a diameter of the cylinder on one end side thereof so as to gradually increase a frictional force between an inner periphery of the reduced-diameter portion and the sealing member.

In the present invention, the piston reciprocates in the cylinder. The annular recessed portion is formed on the outer periphery of the piston, and the sealing member is slidably fitted in the recessed portion. The sealing member is adapted to slidingly contact the inner peripheral surface of the cylinder, and together with the piston forms the air chambers on both sides of the piston, respectively.

Here, the piston is provided with the communicating means which allows the air chambers formed on both sides of the piston to communicate with each other or not to communicate with each other depending on the stopping position of the sealing member which moves in the recessed portion, thereby causing the damping force to become effective or ineffective.

In addition, as the piston moves toward one side of the cylinder, the frictional force acting between the sealing member and the inner peripheral surface of the cylinder increases gradually due to the reduced-diameter portion of the cylinder. Hence, the air damper is capable of exhibiting an appropriate damping force depending on fluctuations in the load acting on the piston.

The above and other objects, features and advantages of the present invention will become more apparent from the following detailed description of the invention when read in conjunction with the accompanying drawings.

DETAILED DESCRIPTION OF THE PREFERRED EMBODIMENTS

Referring now to FIGS. 1 to 8, a description will be given of a first embodiment of the air damper in accordance with the present invention which is applied to a glove box of an automobile.

Figure 1:
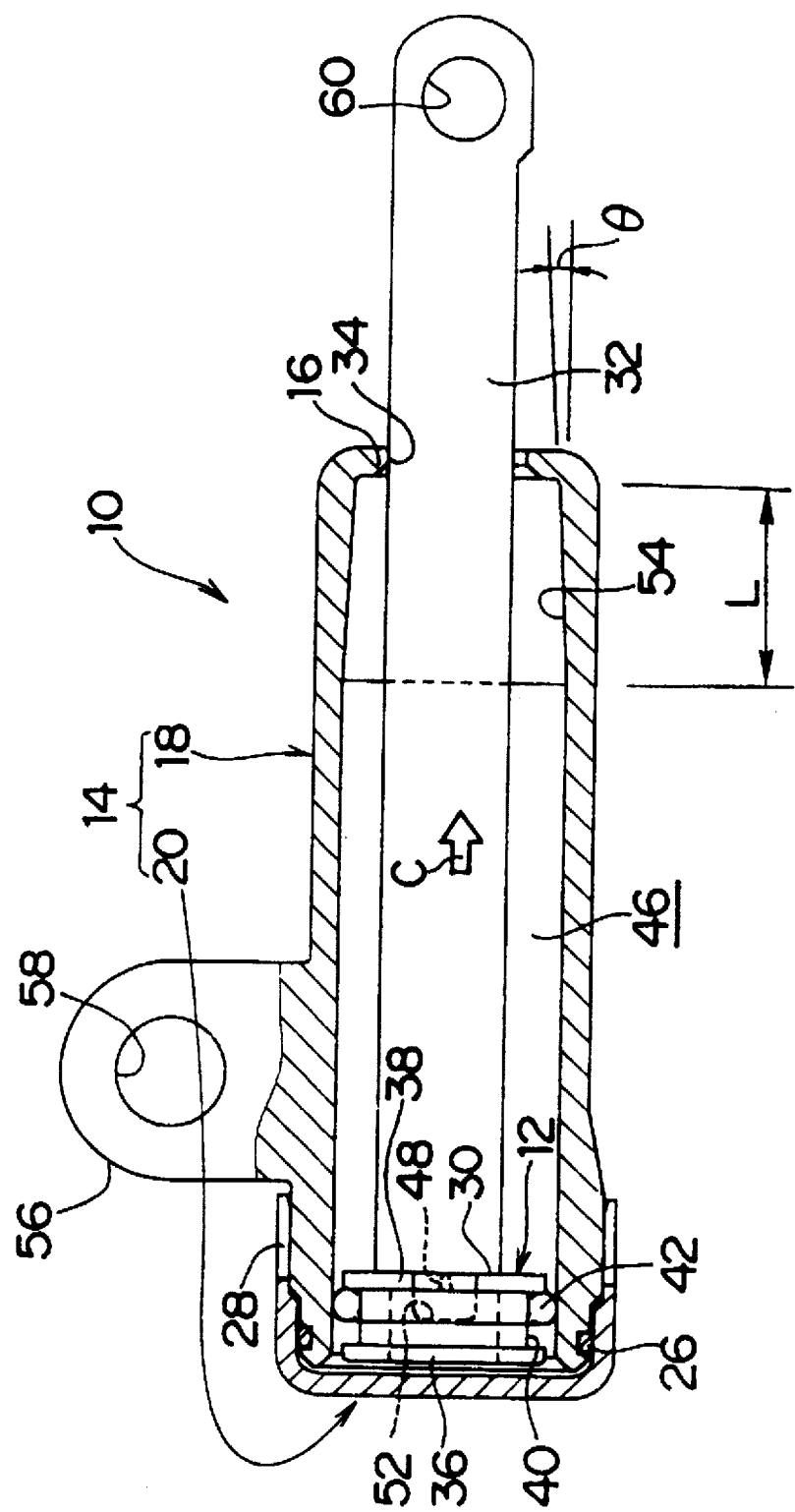
FIG. 1 is a cross-sectional view, taken in the direction of arrow A in FIG. 3, illustrating a state in which a piston is located at a first end of a cylinder of an air damper in accordance with a first embodiment of the present invention.
Figure 3:
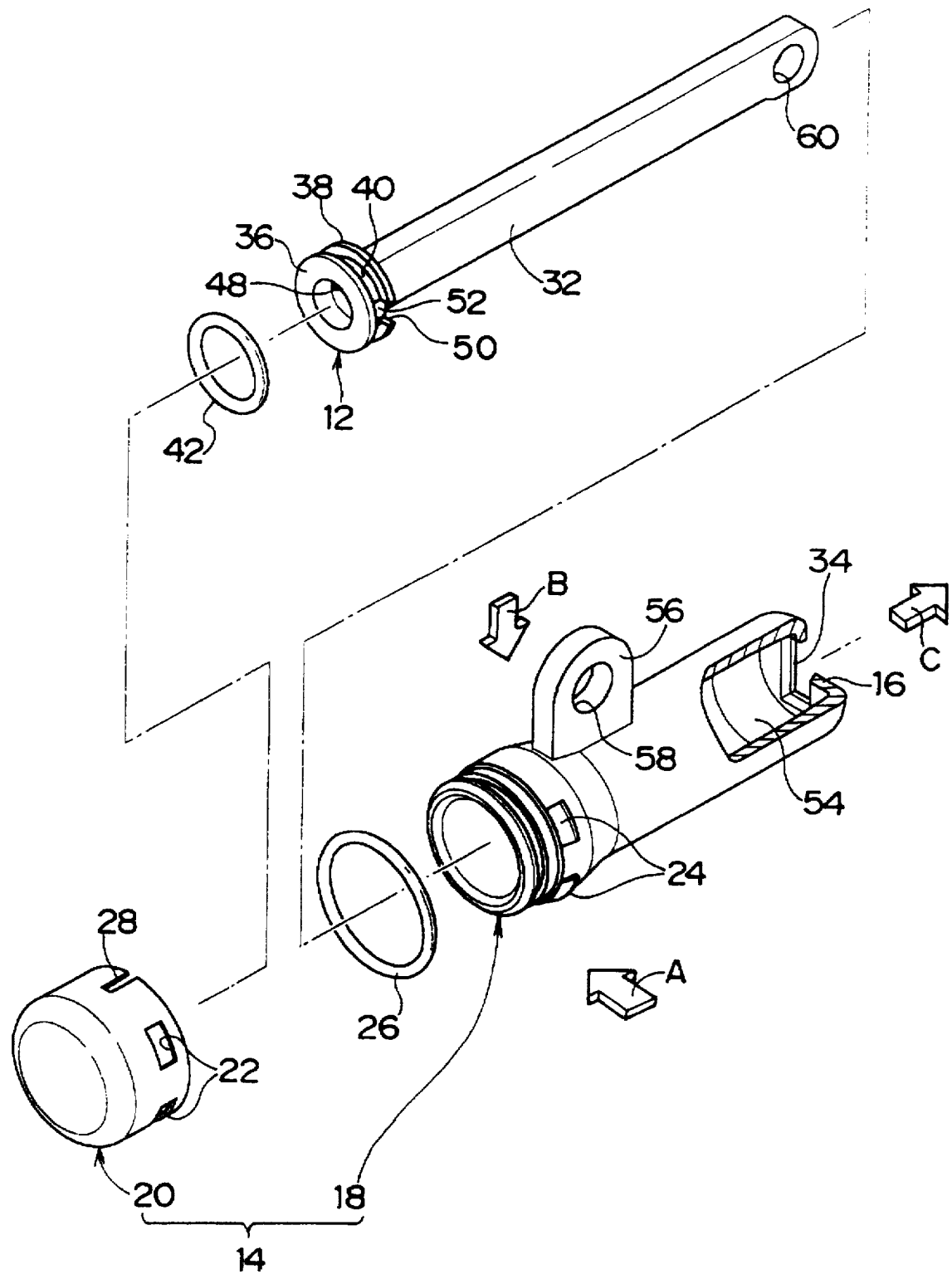
FIG. 3 is an exploded perspective view illustrating the air damper in accordance with the first embodiment.

As shown in FIGS. 1 and 3, in an air damper 10, a piston 12 is reciprocatable in a cylinder 14 between one end, i.e., a first end (a left end in FIG. 1) of the cylinder 14 and another end, i.e., a second end (a right end in FIG. 1) along the axial direction (in the left-and-right direction in FIG. 1) of the cylinder 14. The cylinder 14 is comprised of a cylinder body 18, which has the shape of a hollow cylinder with a bottom and in which the first end is open and the second end is a bottom 16, and a cap 20 for closing the open end, i.e. the first end. The cap 20 has the shape of a hollow cylinder with a bottom, and is fitted on the cylinder body 18 by allowing engaging throughholes 22 provided in the peripheral portion of the cap 20 to engage resiliently to engaging projections 24 projecting from an outer periphery of the cylinder body 18 in correspondence therewith. An O-ring 26 is provided between the inner periphery of the cap 20 and the outer periphery of the cylinder body 18 to provide airtightness for a first air chamber 44 which will be described later. Incidentally, split grooves 28 are formed at the open end of the cap 20 to facilitate the engagement of the engaging projections 24 into the engaging holes 22.

Figure 4:
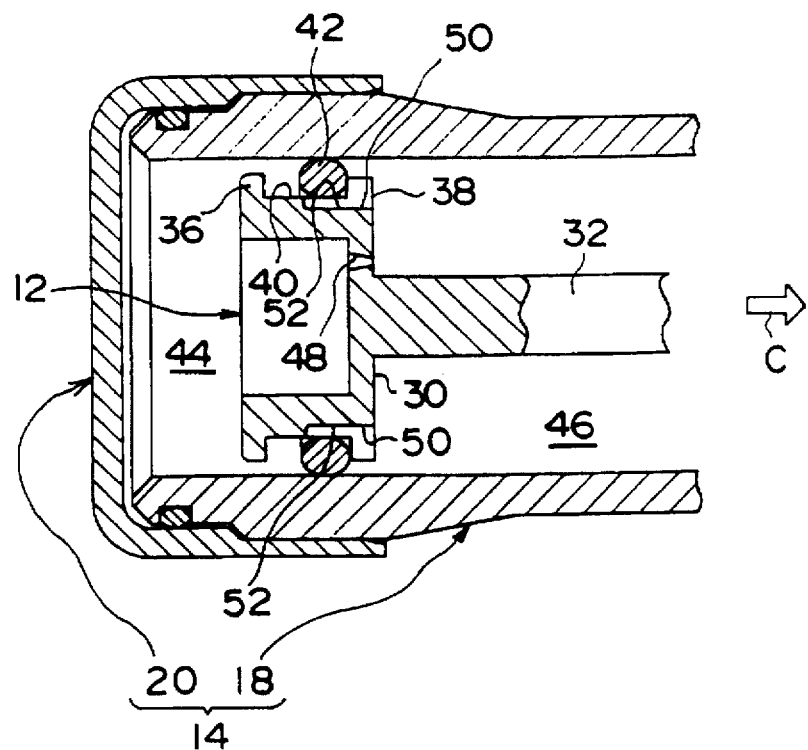
FIG. 4 is an enlarged cross-sectional view, taken in the direction of arrow B in FIG. 3, of a portion of the air damper in accordance with the first embodiment, and illustrates a state in which the piston is located at a portion in the vicinity of the first end of the cylinder.
Figure 5:
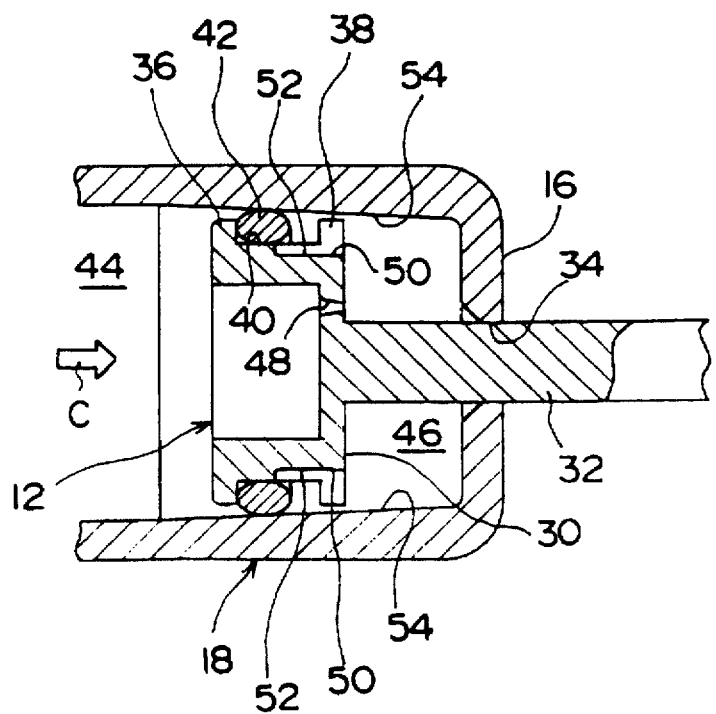
FIG. 5 is an enlarged cross-sectional view, taken in the direction of arrow B in FIG. 3, of the portion of the air damper in accordance with the first embodiment, and illustrates a state in which the piston is located at a portion in the vicinity of the second end of the cylinder.
Figure 6:
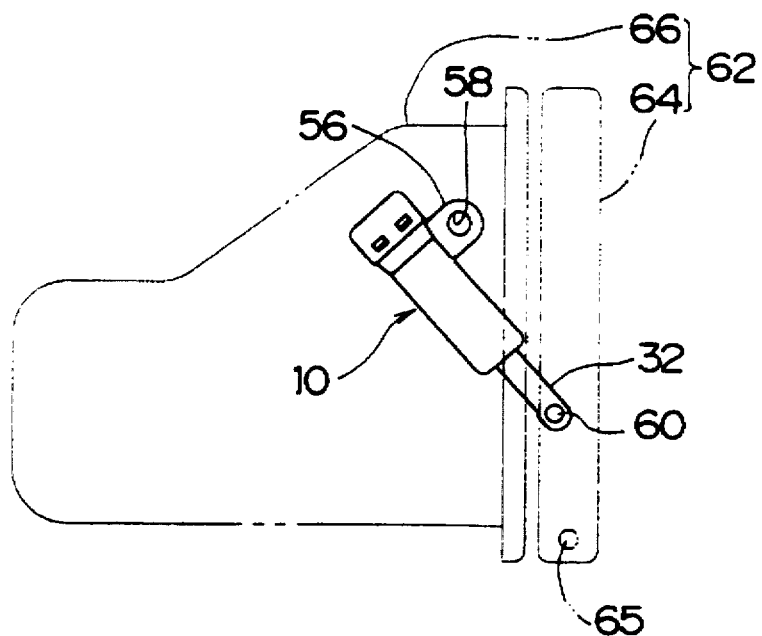
FIG. 6 is a diagram in which the air damper in accordance with this first embodiment is applied to a glove box of an automobile.

As shown in FIGS. 4 and 5, the piston 12 is coaxial with the cylinder 14, and has the shape of a hollow cylinder with a bottom, which is open on a side of the first end of the the cylinder 14 and has a bottom 30 on a side of the second end of the cylinder. One end of a piston rod 32 is connected to the bottom 30 of the piston 12, The piston rod 32 has the shape of an elongated plate, and is positioned concentrically with the cylinder 14. Another end portion of the piston rod 32 penetrates through a through hole 34 (see FIG. 1) provided in the bottom 16 of the cylinder 14, and extends outside the cylinder 14.

The outer periphery of the piston 12 is shaped such that large-diameter portions 36 and 38 are provided to form flanges which are spaced from each other at axial ends thereof, as shown in FIGS. 4 and 5, and an annular recess 40 is formed between the large-diameter portions, i.e. the second flanges, 36 and 38. An O-ring 42 which is formed of an elastic member serving as a sealing member and made of, for example, a synthetic resin such as a rubber, is fitted in the recess 40. In a state in which a gap is formed between the inner periphery of the cylinder 14 and the outer peripheries of the large-diameter portions, i.e., the spaced flanges, 36 and 38, the O-ring 42 abuts against the inner periphery of the cylinder 14, and the first air chamber 44 and a second air chamber 46 are formed in the cylinder 14 on axially opposite sides of the piston 12 (on both sides in the moving direction of the piston 12). That is, the first air chamber 44 is formed on one end side of the cylinder 14, while the second air chamber 46 is formed on the other end side of the cylinder 14.

In addition, the bottom 30 of the piston 12 is provided with an orifice 48 allowing the axially opposite sides of the piston 12 (the first air chamber 44 and the second air chamber 46) to communicate with each other.

Meanwhile, in the recess 40, the O-ring 42 is movable along the axial direction (in the widthwise direction of the recess 40) with respect to the piston 12, and its moving range is set to be between a first position in the recess 40 (the position shown in FIG. 5) at which the O-ring is restricted by abutting against the large-diameter portion (the flange) 36 of the piston 12 on one end side thereof and a second position in the recess 40 (the position shown in FIGS. 1 and 4) at which the O-ring is restricted by abutting against the large-diameter portion (the flange) 38 of the cylinder 14 on the other end side thereof. When the piston 12 changes its moving direction from the moving direction from the first end toward the second end of the cylinder 14 (indicated by arrow C in the drawings) to the moving direction from the second end toward the first end of the cylinder 1, the O-ring 42 moves from the first position toward the second position owing to the frictional force acting between the O-ring 42 and the inner periphery of the cylinder 14.

On the other hand, when the piston 12 moves in the opposite direction, the O-ring 42 moves from the second position toward the first position owing to the frictional force acting between the O-ring 42 and the inner periphery of the cylinder 14.

In addition, portions of the large-diameter portion 38 are cut off along the widthwise direction of the recess 40 to form notches 50, and grooves 52 which respectively communicate with the notches 50 are formed in the bottom of the recess 40. Each groove 52 extends to a widthwise intermediate portion of the recess 40, and does not reach the large-diameter portion 36. When the O-ring 42 is at the second position, the O-ring 42 is located over the grooves 52, and a gap is formed between the inner peripheral surface of the O-ring 42 and the bottom of each groove 52. At this time, the second air chamber 46 and the first air chamber 44 communicate with each other through the notches 50. When the O-ring is at the first position, the O-ring is located in the recess 40, so that the first air chamber 44 and the second air chamber 46 do not communicate with each other.

Incidentally, in this embodiment, two grooves 52 are formed in the recess 40.

Figure 2:
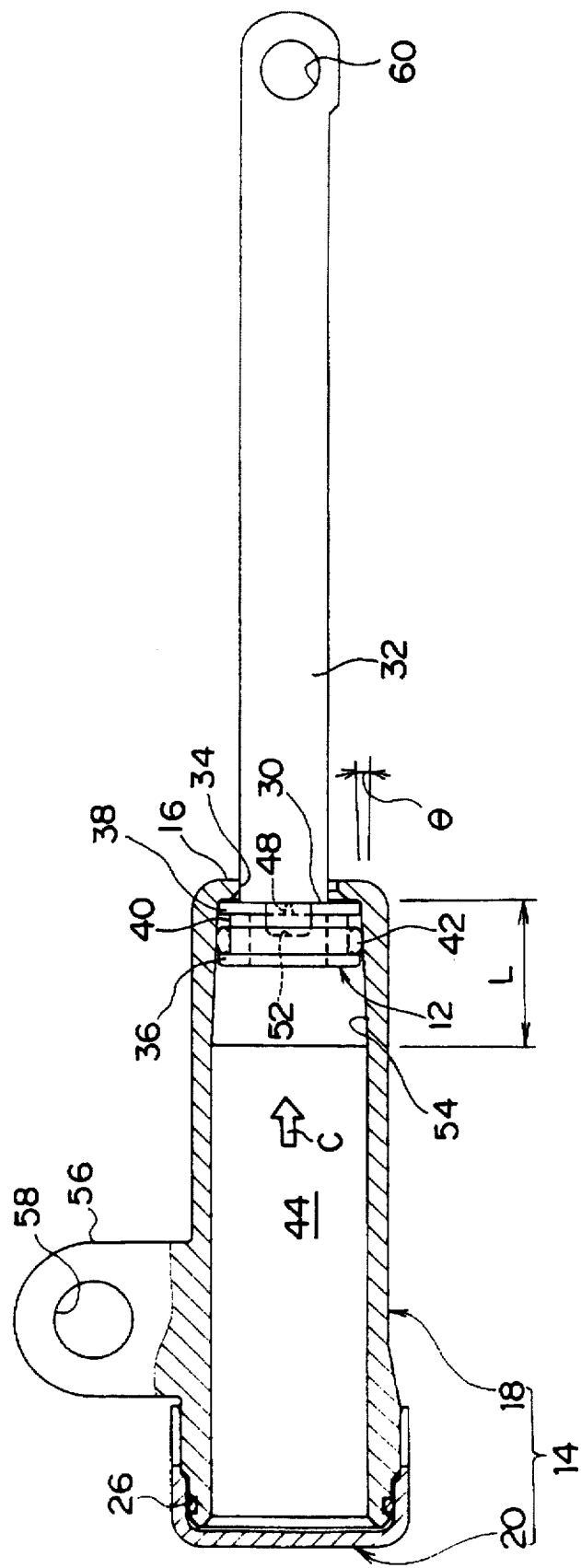
FIG. 2 is a diagram illustrating a state in which a piston is located at a second end of a cylinder, and corresponds to FIG. 1.

In addition, as also shown in FIGS. 2 and 5, a reduced-diameter portion 54 is formed at a portion in the vicinity of the second end of the cylinder 14. In this reduced-diameter portion 54, the inside diameter of the cylinder 14 is gradually reduced toward the second end of the cylinder 14, so that the inner periphery of the cylinder 14 is formed as a tapered surface toward the other second end thereof.

The O-ring 42 is in sliding contact with the inner periphery of the cylinder 14 as the piston 12 moves, so that a frictional force is generated between the O-ring 42 and the inner peripher of the cylinder 14. When the piston moves through a portion which has the same diameter, not the reduced-diameter this frictional force on the O-ring is fixed, but when it is on the reduced-diameter portion 54, the frictional force increases as the piston 12 moves toward the second end of the cylinder 14.

The opening/closing hole formed by each groove 52 is formed to be larger than the diameter of the orifice 48. When the piston 12 moves toward the second end of the piston 14, the flow of air between the first air chamber 44 and the second air chamber 46 is effected by the orifice 48, and the damping force is increased to effect damping on the basis of the flow resistance of the air passing through the orifice 48.

On the other hand, when the piston 12 moves toward the first end of the cylinder 14, the flow of air between the first air chamber 44 and the second air chamber 46 is effected mainly by the grooves 52, and the air escapes through the grooves 52, thereby weakening the damping force to decrease the damping.

A mounting piece 56 is provided projectingly at one end portion of the outer periphery of the cylinder 14, and a mounting hole 58 is formed in the mounting piece 56. In addition, a mounting hole 60 is formed at a projecting tip of the piston rod 32.

Figure 7:
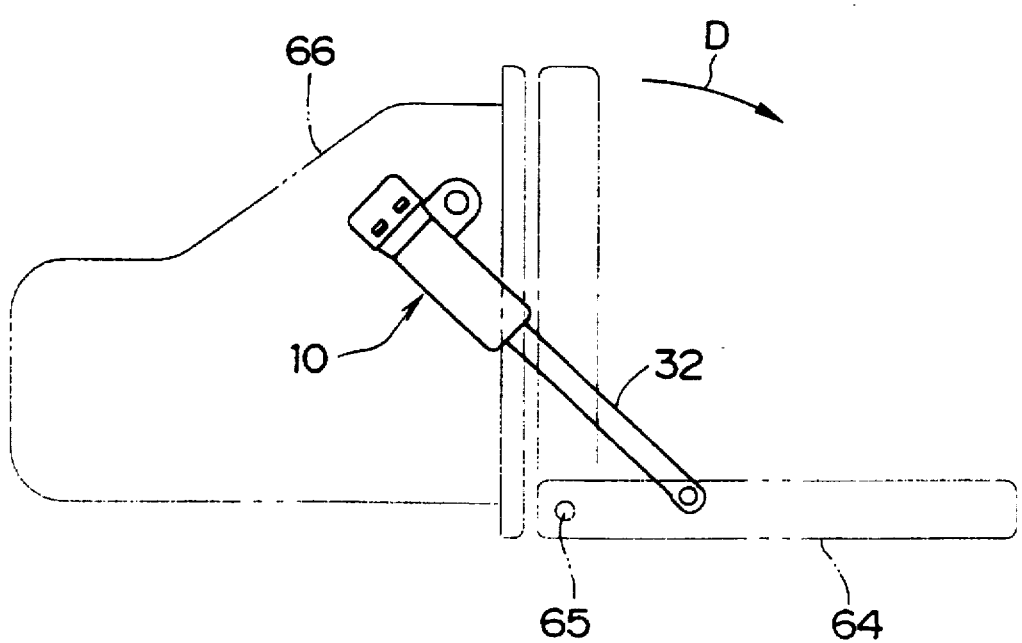
FIG. 7 is a diagram illustrating a state of the air damper when a lid of the glove box is opened, and corresponds to FIG. 6.
Figure 8:
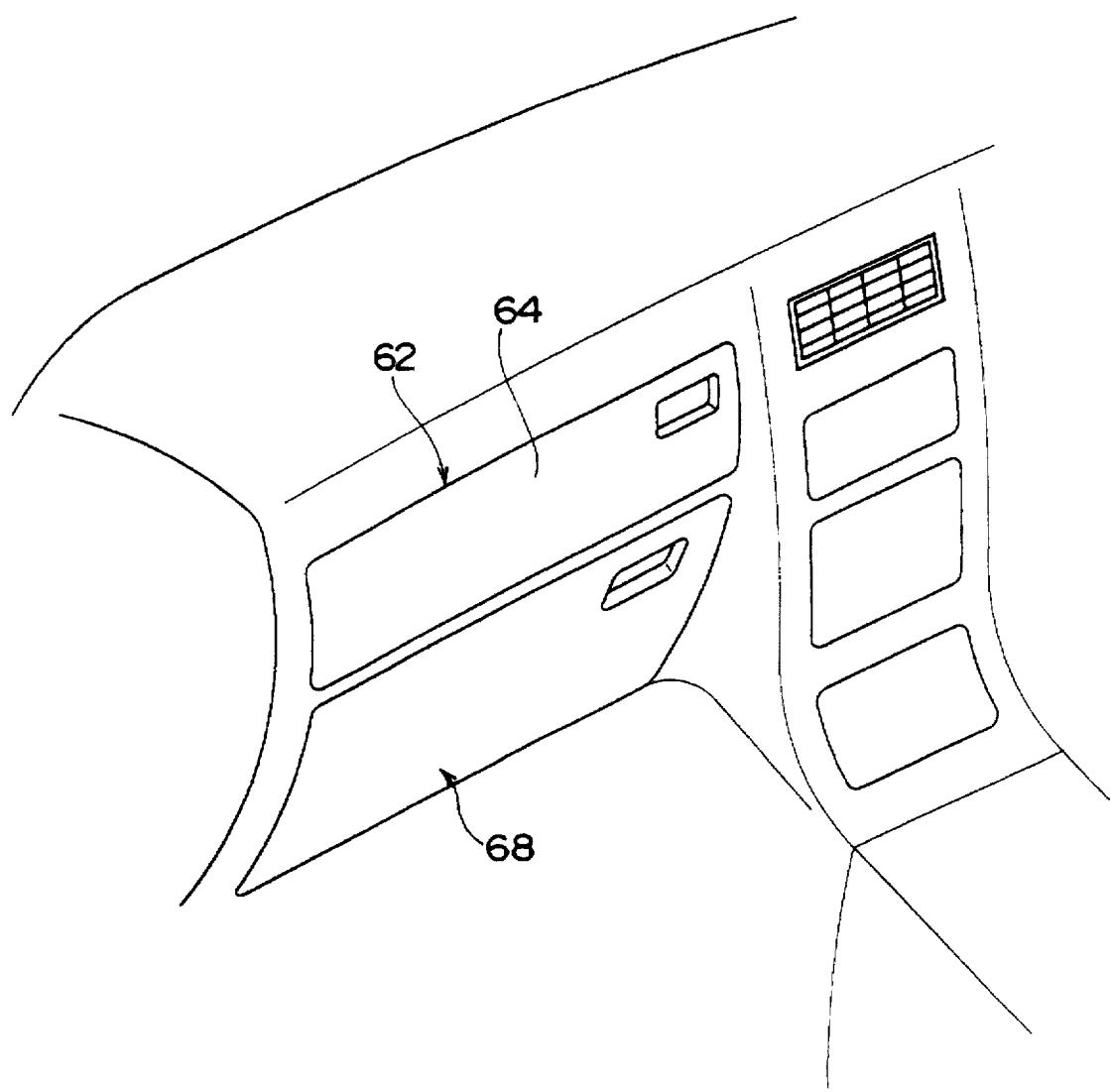
FIG. 8 is a perspective view illustrating a glove box of an automobile.

In a glove box (although two vertically-arranged glove boxes 62 and 68 are shown in FIG. 8, a description will be given of the upper glove box 62) of an automobile in which the air damper 10 arranged as described above is used, as shown in FIGS. 6 and 7, a lid 64 serving as a movable member of the glove box 62 is rotatably supported onto an accommodating portion 66 of the glove box 62 by a rotating shaft 65 at a lower end of the lid 64, such that the lid 64 is closed in its vertical state (the state shown in FIG. 6) and is opened in its horizontal state (the state shown in FIG. 7).

The cylinder 14 is supported on the accommodating portion 66 side of the glove box 62 by means of the mounting hole 58 in the mounting piece 56, and is rotatable about the mounting hole 58. Meanwhile, the piston rod 32 is supported by the lid 64 of the glove box 62 by means of the mounting hole 60, and is rotatable about the mounting hole 60.

When the lid 64 is closed and is in the vertical state, the piston rod 32 is retracted inside the cylinder 14, and the piston 12 is located at the first end of the cylinder 14. As shown in FIG. 7, as the lid 64 in the vertical state (indicated by the alternate long and short dash line in FIG. 7) is opened in the direction of arrow D, the piston rod 32 is extended from the cylinder 14, and the piston 12 moves in the cylinder 14 from the first end toward the second end. In the horizontal position (indicated by the alternate long and two short dashes line in FIG. 7) in which the lid 64 has been completely opened, the piston 12 is located at the second end of the cylinder 14.

In the above-described arrangement, as the piston 12 moves inside the cylinder 14, the air in the first air chamber 44 and the second air chamber 46 flows through the orifice 48, so that the damping is carried out with respect to the opening and closing operation of the lid 64.

When the piston 12 moves, the O-ring 42 is in sliding contact with the inner periphery of the cylinder 14, and the frictional force acting between the O-ring 42 and the inner periphery of the cylinder 14 also imparts a damping force to the lid 64.

When the piston 12 moves from the first end toward the second end of the cylinder 14, and the O-ring 42 reaches the reduced-diameter portion 54 of the cylinder 14, the frictional force acting between the O-ring 42 and the inner periphery of the cylinder 14 thereafter increases as the piston 12 moves toward the second end of the cylinder 14.

That is, as the lid 64 in its vertical state rotates and approaches its horizontal state, the frictional force acting between the O-ring 42 and the inner periphery of the cylinder 14 increases and the damping force increases, thereby making it possible to cope smoothly with fluctuations in the load accompanying the opening of the lid 64. For this reason, the smooth opening operation of the lid 64 can be achieved without bounding or the like at the position of an opening limit (horizontal position) of the lid 64.

In the reduced-diameter portion 54, the cone angle $\theta$ and the axial length L of the reduced-diameter portion 54 shown in FIGS. 1 and 2 can be set appropriately so as to be able to cope suitably with the fluctuations in the load.

In addition, the second end of the cylinder body 18 is formed as the bottom 16 and has the first end open, and the reduced-diameter portion 54 is formed on the bottom 16 side of the cylinder body 18, so that the forming Of the reduced-diameter portion 54 in the cylinder 14 can be facilitated.

Further, if the air damper having the above-described arrangement is applied to the so-called one-way type air damper in which the damping is increased as the piston moves in one direction, while the damping is reduced as the piston moves in the opposite direction, the air damper is effective in a case where when the lid 64 is opened, the opening motion is made slow, whereas when the lid 64 is closed, not much damping is required, or the closing motion is effected rather quickly.

Next, a description will be given of an air damper 110 in accordance with a second embodiment. It should be noted that portions or parts which are identical to those of the first embodiment will be denoted by the same reference numerals, and a description thereof will be omitted.

Figure 10:
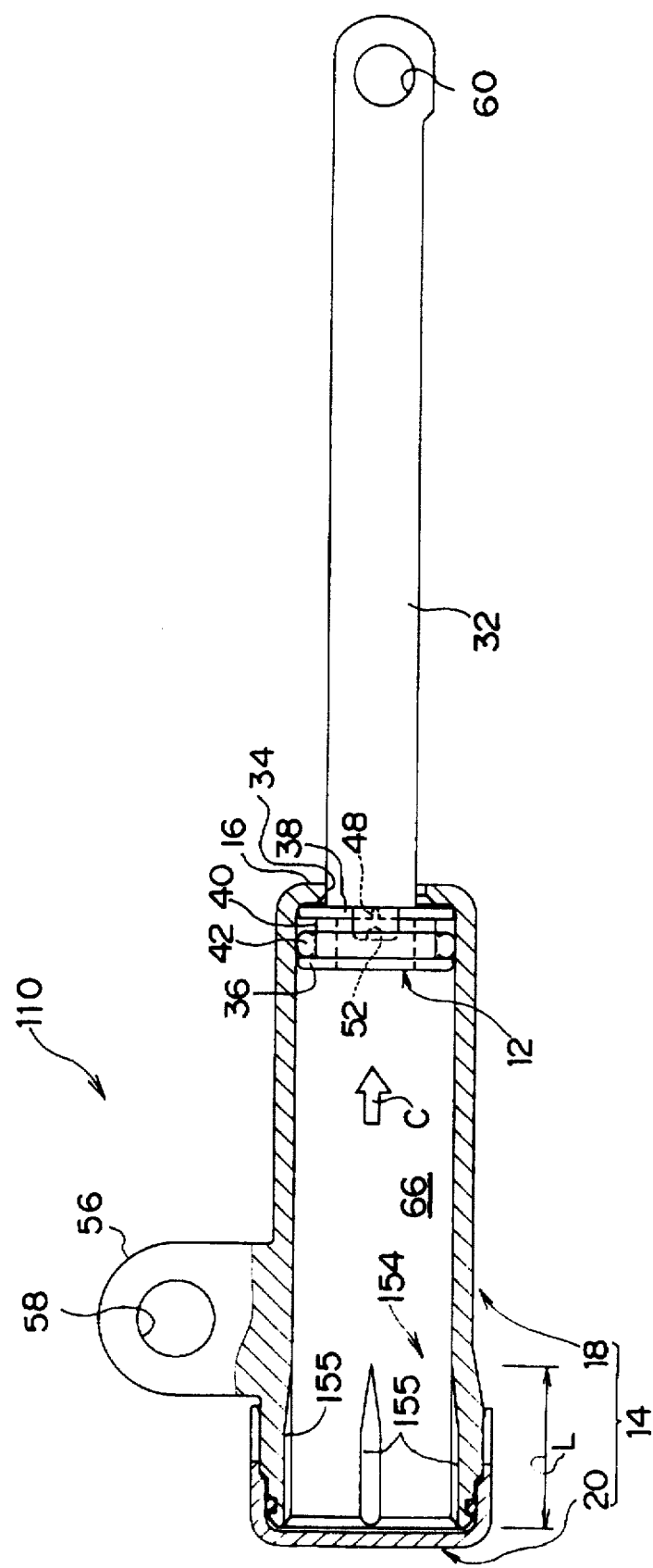
FIG. 10 is a diagram illustrating a state in which the piston is located at the second end of the cylinder, and corresponds to FIG. 9.
Figure 11:
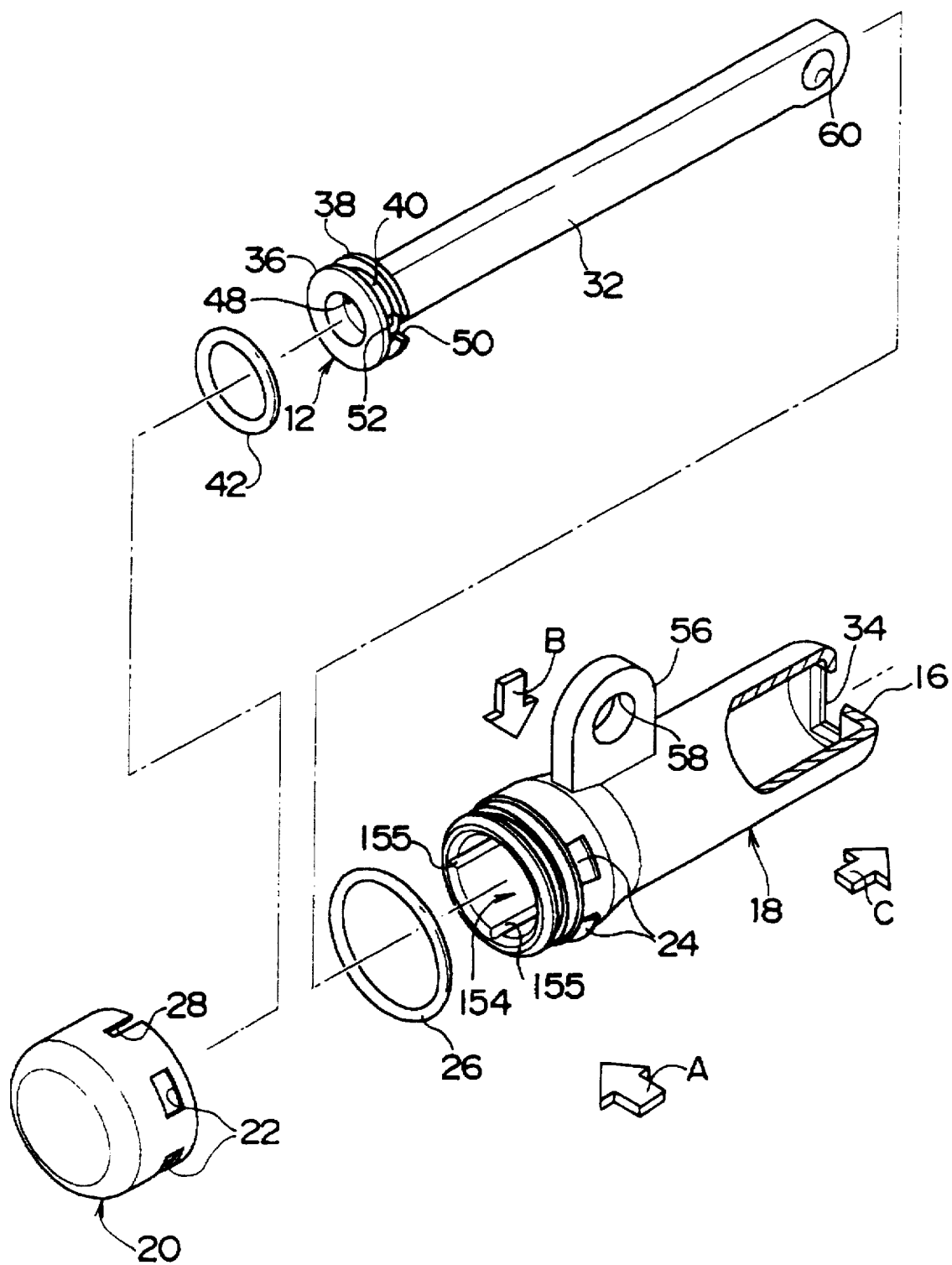
FIG. 11 is an exploded perspective view illustrating the air damper in accordance with the second embodiment.
Figure 12:
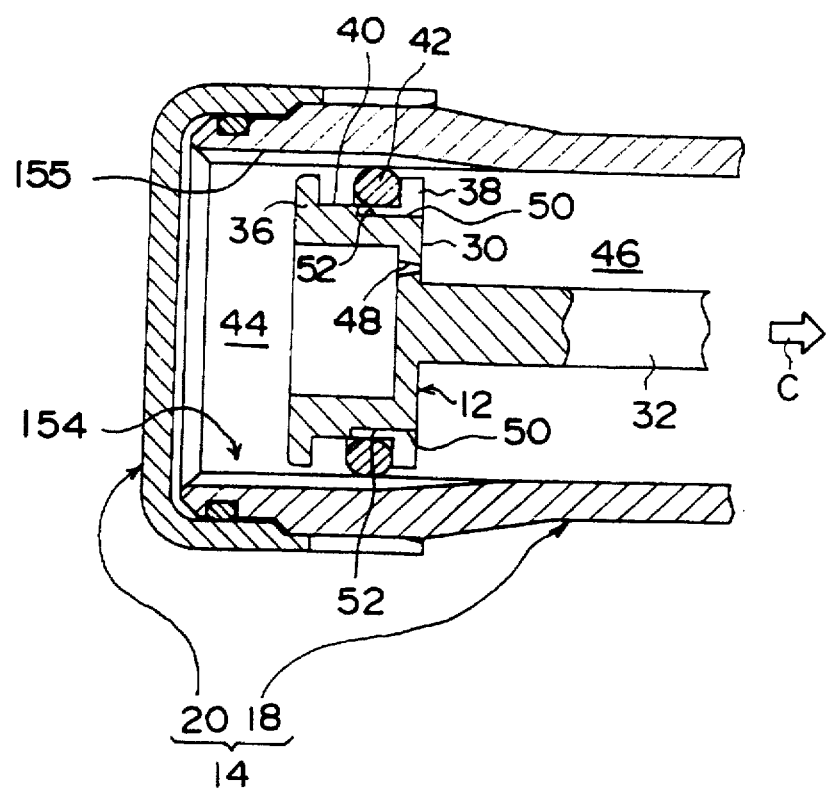
FIG. 12 is an enlarged cross-sectional view, taken in the direction of arrow B in FIG. 11, of a portion of the air damper in accordance with the second embodiment, and illustrates the state in which the piston is located a portion in the vicinity of the second end of the cylinder.
Figure 13:
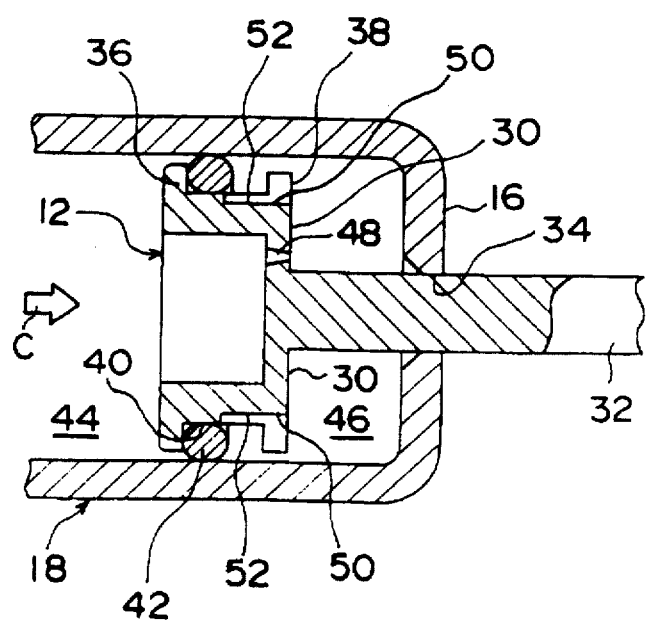
FIG. 13 is an enlarged cross-sectional view, taken in the direction of arrow B in FIG. 11, of the portion of the air damper in accordance with the second embodiment, and illustrates the state in which the piston is located a portion in the vicinity of the second end of the cylinder.
Figure 14:
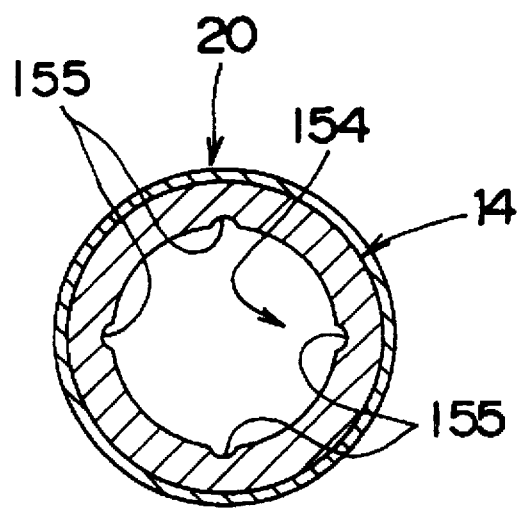
FIG. 14 is a cross-sectional view, taken in the axial direction of the cylinder, of a groove-forming portion.

As shown in FIGS. 10 and 12, a groove-forming portion 154 is formed at a first end portion of the cylinder 14 constituting the air damper 110. In the groove-forming portion 154, grooves 155 are formed on the inner periphery of the cylinder 14. These grooves 155 are recessed such that the diameter of an imaginary circle formed by extending the bottoms of the grooves 155 is larger than the inside diameter of the cylinder 14. The grooves 155 extend from the first end of the cylinder 14 along the axial direction, and four grooves 155 are formed at 90° intervals in the circumferential direction, as shown in FIG. 14. In a case where the O-ring 42 is located in an intermediate portion of the groove-forming portion 154 in its longitudinal direction, each groove 155 forms a gap with respect to the O-ring 42, a first side thereof communicates with the first air chamber 44, while a second side thereof communicates with the second air chamber 46. The combined cross-sectional areas of the grooves 155 are formed to be larger than the cross-sectional area of the orifice 48.

Accordingly, when the piston 12 moves from the first end toward second end of the cylinder 14, the O-ring 42 is located at the groove-forming portion 154 at the portion in the vicinity of the first end of the cylinder 14, and air escapes through the grooves 155, thereby weakening the damping force to decrease the damping. After the O-ring 42 has left the groove-forming portion 154, as the piston 12 moves toward the second end of the cylinder 14, the damping becomes effective on the basis of the orifice 48.

For this reason, during an early period of the movement of the lid 66 when the load acting on the piston 12 is small, it is possible to effectively obtain a free moving state which does not exert a damping force, thereby making it possible to cope with fluctuations in the load accompanying the opening of the lid 66.

Figure 9:
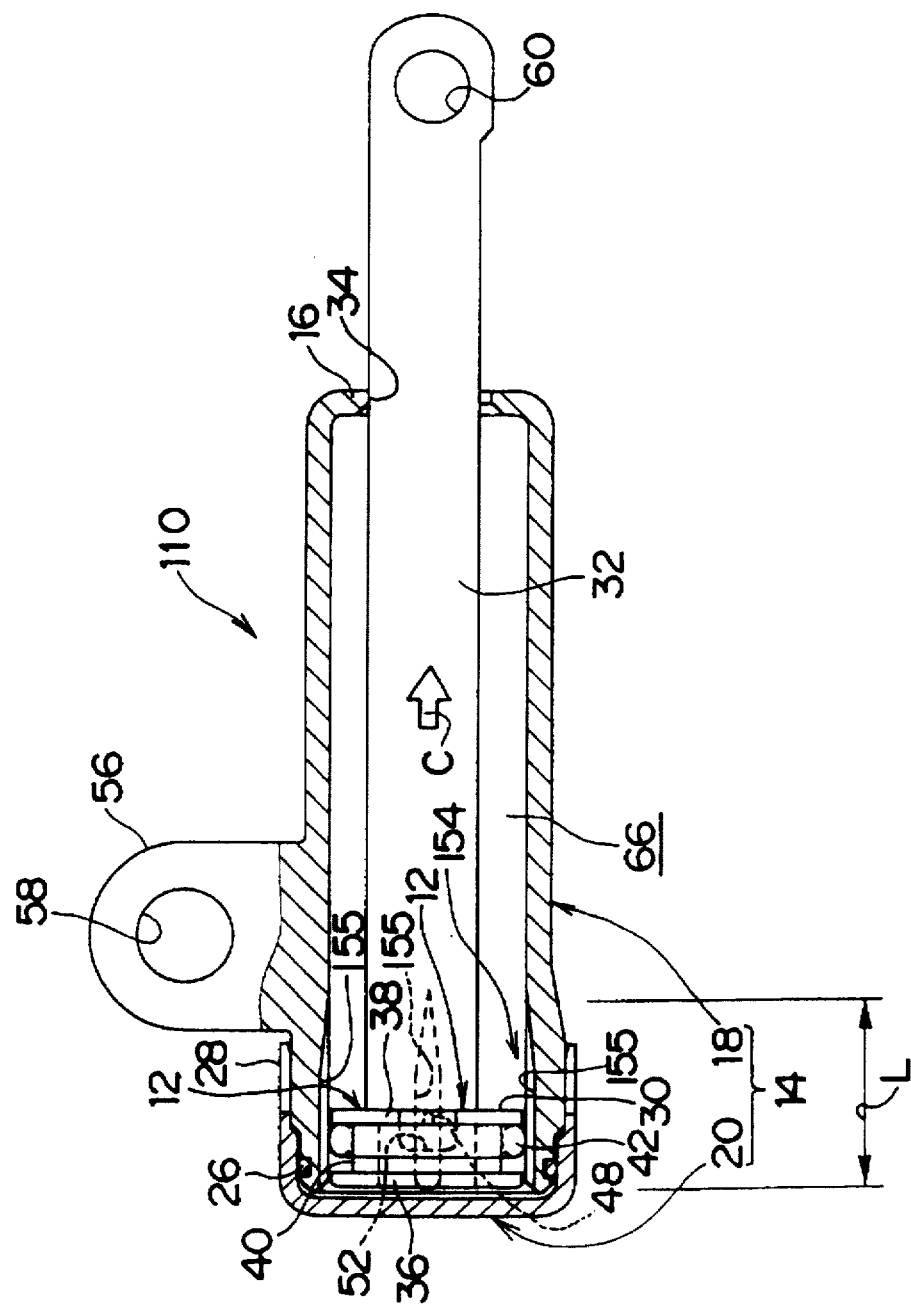
FIG. 9 is a cross-sectional view, taken in the direction of arrow A in FIG. 11, of an air damper in accordance with a second embodiment of the present invention.

It should be noted that, as for the groove-forming portion 154, the axial length L (see FIGS. 9 and 10) of the groove-forming portion 154, the number of the grooves 155, the shape and the size of each groove 155, and the like are set appropriately so as to cope suitably with the fluctuations in the load.

As for the grooves 155, it is sufficient if the diameter of the imaginary circle formed by extending the bottoms of the grooves 155 is larger than the inside diameter of the cylinder 14. Although, in the above-described embodiment, the grooves 155 are elongated, the width (circumferential dimension) of each groove 155 may not be narrow, as in the above-described embodiment, but wide, and is not limited to a particular width.

Further, the cylinder 1 has the shape of a hollow cylinder with a bottom the second end of which is formed as the bottom 16, and the first end of which is open, and the groove-forming portion 154 is formed on the open end side of the cylinder 14. Since the diameter of the imaginary circle formed by extending the bottoms of the grooves 155 of the groove-forming portion 154 is made larger than the inside diameter of the cylinder 14, the forming of the groove-forming portion 154 in the cylinder 14 is facilitated.

As the piston 12 moves, the O-ring 42 slidingly contacts the inner periphery of the cylinder 14, and a frictional force is produced between the O-ring 42 and the inner periphery of the cylinder 14. Since the grooves 155 are recessed such that the diameter of the imaginary circle formed by extending the bottoms of the grooves 155 is larger than the inside diameter of the cylinder 14, the O-ring 42 is not brought into contact with the grooves 155 in the groove-forming portion 154, so that the contact pressure does not increase. Instead of forming the grooves 155, it is conceivable to provide ribs projecting inwardly from the inner periphery of the cylinder 14. In this case, however, the ribs bite into the O-ring, so that the resistance becomes large. Still alternatively, instead of forming the grooves 155, it is conceivable to form a cone surface on the inner periphery of the cylinder 14 by gradually enlarging the inside diameter of the cylinder 14 on the portion in the vicinity of the first end thereof. In this case, however, there is a zone in which the cone surface and the O-ring fail to contact each other depending on the position of the piston 12, so that a clearance is formed between the piston 12 and the inner periphery of the cylinder 14. As a result, the piston rod moves in an undulating manner and becomes unstable.

Figure 15:
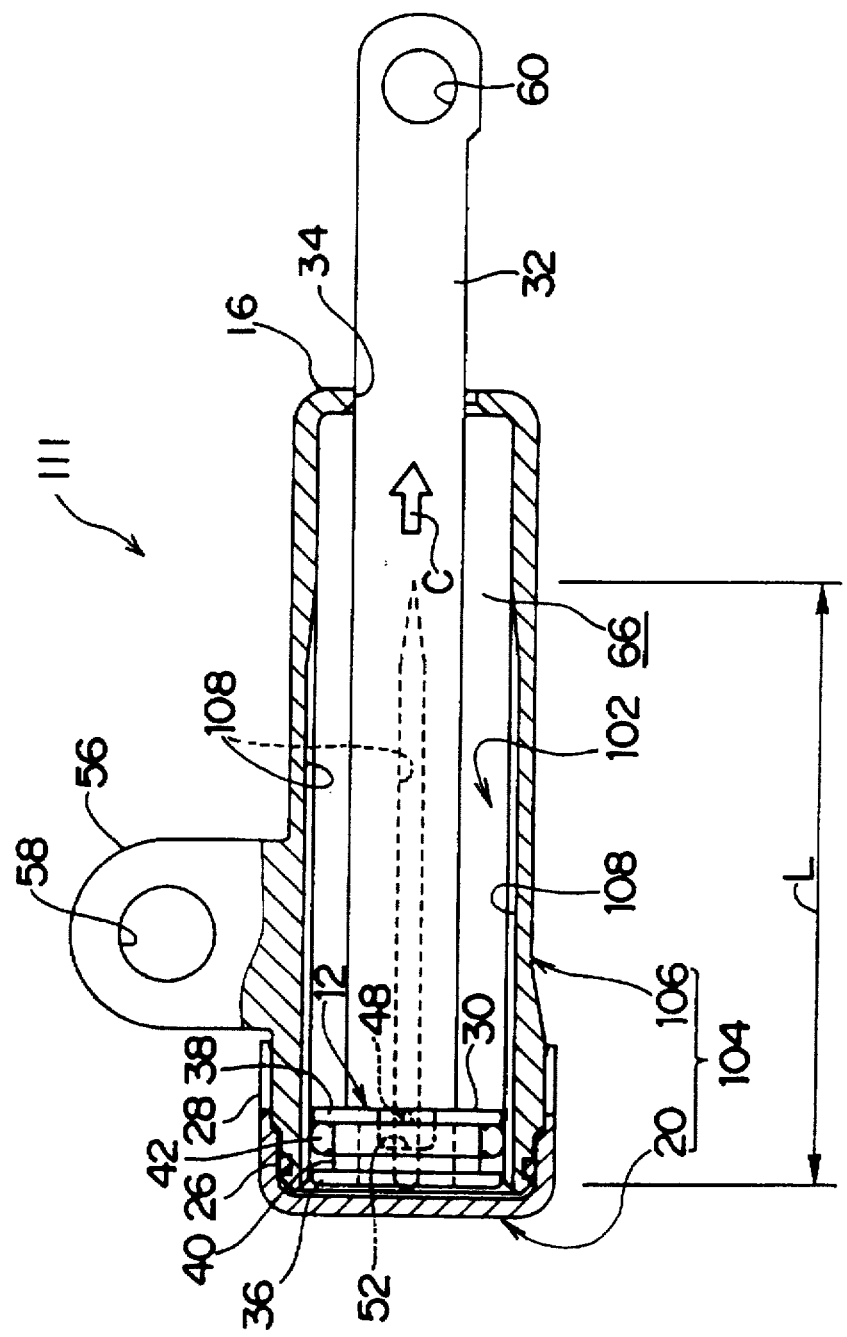
FIG. 15 is a diagram illustrating a third embodiment, and corresponds to FIG. 9.
Figure 16:
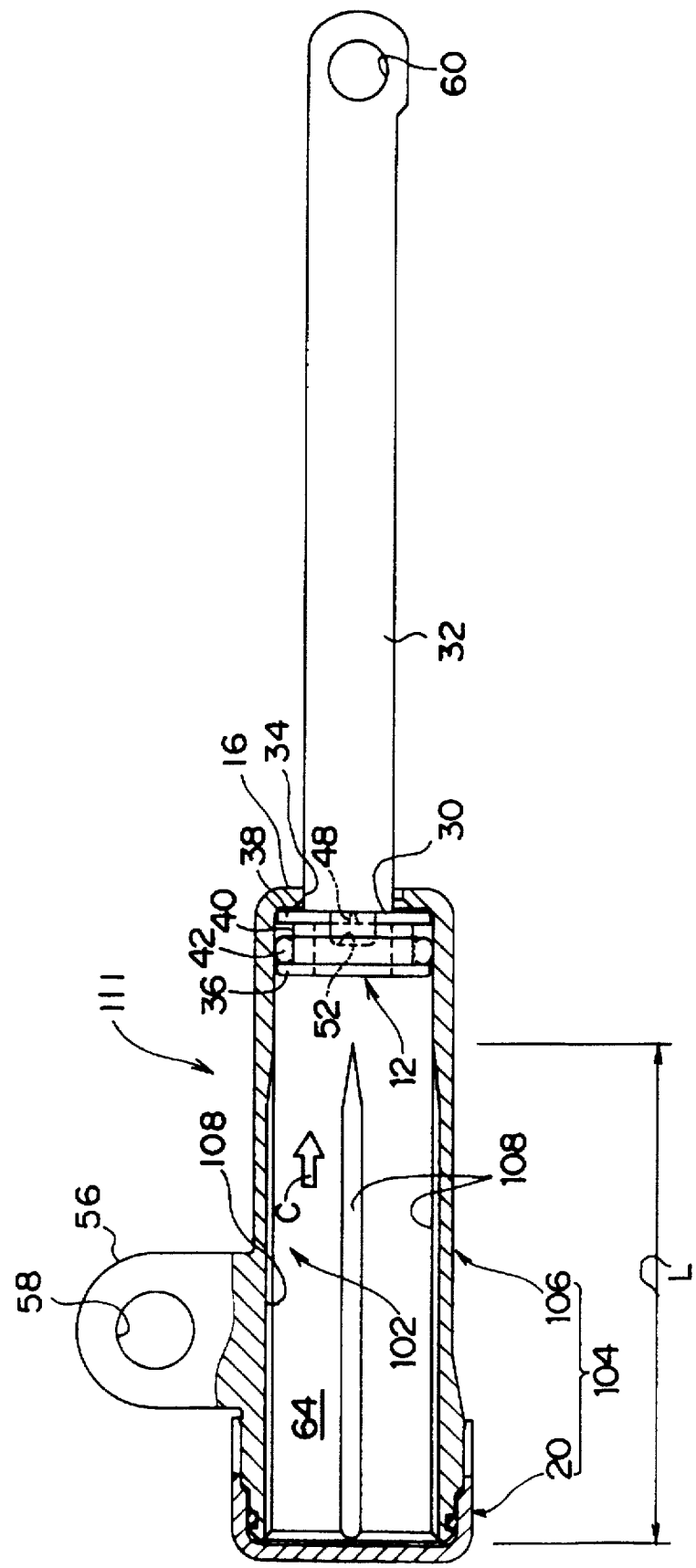
FIG. 16 is a diagram illustrating the third embodiment, and corresponds to FIG. 10.

Referring now to FIGS. 15 and 16, a description will be given of a third embodiment.

In the above-described second embodiment, the groove-forming portion 154 is formed in the portion in the vicinity of the first end of the cylinder 14. In an air damper 111 of this embodiment, however, a groove-forming portion 102 is formed not only the portion in the vicinity of the first end portion of the cylinder 14 but also at a portion excluding the portion in the vicinity of the second end of a cylinder body 106 of a cylinder 104 in such a manner as to extend from one end of the cylinder 104. In addition, the orifice 48 similar to the one in the second embodiment is used as a first orifice, and grooves 108 in the groove-forming portion 102 are used as second orifices.

In accordance with this arrangement, at a time when the piston 12 moves from the first end toward the second end of the cylinder 104, when the O-ring 42 is at the groove-forming portion 102, air flow takes place through the orifice 48 and the grooves 108, so that the damping force is weakened due to the orifices 48 and 108, thereby reducing the damping.

Meanwhile, when the O-ring 42 leaves the groove-forming portion 102 and reaches the second end portion of the cylinder 14, air does not flow in the grooves 108, and air flow takes place only by the orifice 48, so that the damping becomes effective, thereby making it possible to cope with fluctuations in the load.

Incidentally, as for the groove-forming portion 102, the axial length L of the groove-forming portion 102, the number of the grooves 108, the shape of each groove 108, and the like are set as required so as to cope suitably with the fluctuations in the load, in the same way as in the above-described first embodiment. The other arrangements and advantages in operation are similar those of the second embodiment.

Although in the foregoing embodiments a description has been given of a case in which the air damper is applied to a glove box of an automobile, the present invention is not limited to the same. For instance, the air damper in accordance with the present invention is applicable to other items such as an opening/closing cover of an operation panel of a television set or the like.

In addition, although in the above-described embodiments a lid serving as a movable member is connected to the piston side, the lid may be conversely connected to the cylinder side.

As described above, in accordance with the air damper of the present invention, it is possible to cope with fluctuations in the load by varying the damping force, thereby obtaining a suitable damping.

What is claimed is:

1. An air damper comprising;

a cylinder:

a piston adapted to reciprocate in said cylinder;

an annular recessed portion formed along an outer periphery of said piston;

a sealing member slidably movable in said annular recessed portion between at least two positions, said sealing member slidingly contacting an inner peripheral surface of said cylinder, said sealing member and said piston cooperating to form air chambers on both sides of said piston;

communicating means allowing said air chambers formed on both sides of said piston to communicate with each other or not to communicate with each other depending on the position of said sealing member in said recess;

said cylinder having a portion of reduced interior diameter in the vicinity of one end of said cylinder, said portion gradually decreasing in interior diameter toward said one end to gradually increase frictional force between said portion of reduced interior diameter and said sealing member in order to provide a gradually increasing damping effect.

2. An air damper according to claim 1, wherein said cylinder is a hollow cylindrical member with a bottom, one end of said cylinder being open, said open end being hermetically closed by a cap, said bottom being provided with a through hole through which a piston rod connected to said piston is passed through.

3. An air damper according to claim 2, wherein said cap is provided with an engaging hole in which a projection on an outer periphery of said cylinder in a vicinity of said opening is capable of engaging.

4. An air damper according to claim 2, wherein said reduced-diameter portion is provided on a bottom side of said hollow cylindrical member.

5. An air damper according to claim 2, wherein an O-ring is provided between engaging surfaces of said cap and said hollow cylindrical member.

6. An air damper according to claim 1, wherein said piston has a piston rod, and said piston is provided with an orifice penetrating said piston.

7. An air damper according to claim 6, wherein a diameter of said orifice is smaller than a communicating hole formed by said communicating means.

8. An air damper according to claim 1, wherein said sealing member is an O-ring.

9. An air damper comprising:
a cylinder;
a piston adapted to reciprocate in said cylinder;
said piston having spaced flanges on an outer periphery thereof defining therebetween an annular recessed portion;
a sealing member slidably movable in said annular recessed portion between at least first and second positions, said sealing member slidingly contacting an inner peripheral surface of said cylinder, said sealing member and said piston cooperating to form air chambers on both sides of said piston;
communicating means comprising a notched portion in one of said flanges, and a groove in a bottom of said annular recessed portion extending from a predetermined position in said annular recessed portion to said notched portion to communicate or not to communicate with said air chamber formed on both sides of said piston depending on the position of said sealing member in said recess;
said cylinder having a portion of reduced interior diameter in the vicinity of one end of said cylinder, said portion gradually decreasing in interior diameter toward said one end to gradually increase frictional force between said portion of reduced interior diameter and said sealing member in order to obtain a gradually increasing damping effect.

10. An air damper according to claim 9, wherein said first position is adjacent one of said spaced flanges and said second position is adjacent another of said spaced flanges, and wherein said sealing member is movable therebetween.

* * * * *